United States Patent
Doerr et al.

(10) Patent No.: US 8,477,991 B2
(45) Date of Patent: Jul. 2, 2013

(54) METHOD FOR WATERMARKING FREE VIEW VIDEO WITH BLIND WATERMARK DETECTION

(75) Inventors: Gwenael Doerr, Cesson Sevigne (FR); Severine Baudry, Cesson Sevigne Cedex (FR); Javier Franco-Contreras, Cesson Sevigne Cedex (FR)

(73) Assignee: Thomson Licensing, Issy-les-Moulineaux (FR)

( * ) Notice: Subject to any disclaimer, the term of this patent is extended or adjusted under 35 U.S.C. 154(b) by 78 days.

(21) Appl. No.: 13/199,308

(22) Filed: Aug. 25, 2011

(65) Prior Publication Data

US 2012/0063634 A1 Mar. 15, 2012

(30) Foreign Application Priority Data

Sep. 1, 2010 (EP) .................................... 10305940

(51) Int. Cl.
*G06K 9/00* (2006.01)
(52) U.S. Cl.
USPC ......................................................... 382/100
(58) Field of Classification Search
USPC ........................................................... 382/100
See application file for complete search history.

(56) References Cited

U.S. PATENT DOCUMENTS

| 7,502,759 B2 * | 3/2009 | Hannigan et al. | 705/51 |
| 2011/0052093 A1 * | 3/2011 | Porter | 382/284 |

FOREIGN PATENT DOCUMENTS

WO    WO2008041061    4/2008

OTHER PUBLICATIONS

Zhu et al., "A Novel Digital Watermarking Method for New Viewpoint Video Based on Depth Map", Intelligent Systems Design and Applications, 2008, ISDA '08, Nov. 26, 2008, pp. 3-7.
Apostolidis et al., "Free-View TV Watermark Selection Based on the Distribtion Characteristics", 3DTV Conference: The True Vision-Capture, Transmission and Display of 3D Video, 2009, IEEE, May 4, 2009, pp. 1-4.
EP Search Report dated Dec. 28, 2010.
Franco-Contreras, Javier et al., "Virtual View Invariant Domain for 3D Video Bland Watermarking", 18th IEEE International Conference on Image Processing (2011), Sep. 11, 2011, pp. 2817-2820.

* cited by examiner

*Primary Examiner* — Shefali Goradia
(74) *Attorney, Agent, or Firm* — Robert D. Shedd; Patricia Verlangieri (57) ABSTRACT

The invention relates to a method for watermark embedding in multi views video comprising a plurality of views captured with a plurality of cameras comprising for each view a step of projecting the view onto a domain invariant to the plurality of views and to intermediate synthesized view, which depends on the locations, orientations, and intrinsic parameters of the cameras, resulting into an invariant vector; a step of applying a watermarking algorithm to the invariant vector resulting into a watermarked invariant vector; and a step of modifying the view to obtain a watermarked view, wherein said watermarked view when projected onto the invariant domain results into the watermarked invariant vector.
The invention also relates to a method for watermark detection in a rendered view comprising a step of projecting the rendered view onto an invariant domain to the plurality of views resulting into an invariant rendered vector; a step of applying a watermark detection algorithm to the invariant rendered vector in order to assess the presence of a watermark.

13 Claims, 6 Drawing Sheets

METHOD FOR WATERMARKING FREE VIEW VIDEO WITH BLIND WATERMARK DETECTION

This application claims the benefit, under 35 U.S.C. §119 of EP Patent Application 10305940.8, filed 1 Sep. 2010.

FIELD OF THE INVENTION

The invention relates to watermarking of free view video. More particularly the invention relates to a method for watermark embedding in multi view video and associated method for watermark detection in free view video.

BACKGROUND OF THE INVENTION

Free view television consists in transmitting several views of the same scene, captured with different cameras. The user is free to display any of the transmitted views of the scene, or even to synthesize an intermediate view from transmitted views, which corresponds to the view of a virtual camera. Therefore real views are completed at the reception side, by so called synthetic or virtual views. The user selects freely the viewing position and the angle of the virtual camera.

Besides, 3D television also relies on multi view video. In stereo 3D, both a right and a left view are displayed so that the user enjoys 3D images. A baseline correction on a right view or a left view is sometimes needed, depending on the user environment. For instance, it depends on the dimensions of the display, on sitting distance. In this case, a left or right virtual view is synthesized.

As for standard TV, copyrights protection remains a concern in free view video. Among many alternative copyrights managements systems, watermarking techniques embed imperceptible information hidden in images. This information is used in forensics to identify the source of an illegal copy. However watermark embedding and watermark detection in multi view video are more complicated than in mono view video. Indeed, the watermark must be detectable on any real or virtual view displayed by the TV set. Therefore the watermark needs to be embedded in a coherent ways in each view so that it appears correctly in any real or virtual view.

A main challenge has emerged as the coherent watermark embedding allowing known watermark detection techniques in virtual views rendered for arbitrary cameras.

In "*Watermarking of free-view video*" (in "IEEE Transactions on Image Processing" volume 19, pages 1785-1797, July 2010), A. Koz, C. Cigla and A. Alatan disclose a method for embedding a watermark into multi views by exploiting the spatial masking properties of the human visual system. They also disclose a method for detecting watermark by exploiting the position and the rotation of a virtual camera. However the method for watermark detection requires at least one of the original views and the parameters of cameras, which are not always available. In case of unknown cameras parameters, they disclose to use the original views, along with corresponding depth-map information, to estimate the camera position and orientation of the synthesized view. The method comprises a step of transforming the original video with respect to the estimated parameters, and a step of subtracting it to the synthesized view. The correlation between the resulting signal and the watermark signal provides better performance in the watermark detection. However the estimation of the cameras parameters requires heavy processing, such watermark detection is complex and time consuming. Besides, the detection performances are sensitive to the cameras parameters estimation.

Thus known methods for watermark detection in free view video raise the issue of the detection for rendered views both for known and unknown cameras position and orientation. As a consequence, the issue of a coherent watermark embedding enhancing watermark detection is raised. In the state of the art, these issues are solved using one of the original views.

A method for watermark embedding in multi view video allowing blind detection in any rendered view, real or virtual, is therefore is needed.

SUMMARY OF THE INVENTION

The purpose of the invention is to overcome at least one of the disadvantages of prior art by proposing an embedding method which does not require cameras parameters nor any of the real views at detection. The idea of the invention is to find a domain invariant to the different views of a same scene, whether real views or virtual views, and to apply the watermark in this domain. Invariant domains are proposed for various location and orientation of cameras.

To this end, the invention relates to a method for watermark embedding in multi view video comprising a plurality of views captured with a plurality of cameras. The method is remarkable in that it comprises, for each view, a step of projecting the view onto a domain invariant to the plurality of views and to intermediate synthesized views, which depends on the locations, orientations, and intrinsic parameters of the cameras, resulting into an invariant vector; a step of applying a watermarking algorithm to the invariant vector resulting into a watermarked invariant vector; a step of modifying the view to obtain a watermarked view, wherein said watermarked view when projected onto the invariant domain results into the watermarked invariant vector. Thus, alignment between the rendered video and original video is no longer needed prior to watermark detection since each view is projected onto the same invariant vector. The invention is advantageously well adapted to blind detection in arbitrary rendered view. Moreover, the embedding processing and detection processing are easier and faster than known methods. Finally, the invention moves the issue of multi views watermarking into single vector watermarking. Thus, known watermark algorithm advantageously applies to the invariant vector watermarking.

According to a particularly advantageous characteristic of the invention, the step of modifying the view into the watermarked view further comprises a step of subtracting the invariant vector from the watermarked invariant vector obtaining the invariant watermark vector; a step of distributing the invariant watermark vector along the view invariant dimension resulting into a watermark signal; a step of merging the watermark signal with the view resulting into a watermarked view. Indeed, the step of modifying the view to obtain a watermarked view raises the issue of the inverse function of the projection in the invariant domain. Such characteristic of the invention, proposes a solution for projecting back the watermarked invariant vector to the view.

In a first preferred embodiment, the invariant domain comprises the plurality of samples values along any line parallel to the line passing through the optical centers of the cameras, provided that (i) the optical axis of the cameras are parallel, (ii) the optical axis are orthogonal to the line passing through the optical centers of all cameras, (iii) all cameras share the same focal distance, and (iv) there is no rotation between the cameras. The position of a pixel in different views, either real or virtual, is obtained by shifting the corresponding pixel from one view to another by a displacement along a line parallel to the line passing through the optical centers of all cameras. The amplitude of this displacement depends on the depth of the pixel and the parameters of the virtual and real cameras. When real and virtual cameras are aligned for instance on a horizontal axis, which is the case in most applications such as baseline correction in stereo 3D, the displacement is along the horizontal axis only. Thus, if the watermark signal is invariant along the horizontal axis, it will be the same on any real or virtual view. Hence, thanks to a constraint on the cameras position and orientation, such as alignment and orientation, the watermark detection can be done blindly, without the knowledge of the exact camera parameters, therefore without needing the original view. Other constraints on the cameras result in other constraints in the pixel displacements, hence providing a different invariant domain.

In a second preferred embodiment, the step of projecting further comprises summing samples values along parallel lines of the view. In a variant where the cameras are aligned on a horizontal line, the samples values are summed along horizontal lines of the view. Indeed, since the pixels are displaced for example on a line, the sum of the different pixel values along the line remains constant from one view to another. In practice, the problem is slightly more complicated because of occlusions: some objects parts appear only on some views, and not on others. However, occlusions cover only a very small area of the views and can be neglected for our purpose.

In a third preferred embodiment, the step of projecting the view further comprises a first step of transforming the view into a spatial-frequency representation of the view. Accordingly, the step of modifying the view into the watermarked view further comprises the step of subtracting the invariant vector from the watermarked invariant vector obtaining the invariant watermark vector; the step of distributing the invariant watermark vector along the invariant dimension of the spatial-frequency representation of the view resulting into a watermark signal; a step of merging the watermark signal with the spatial-frequency representation of the view resulting into a watermarked spatial-frequency representation of the view; a step of transforming back the watermarked spatial-frequency representation of the view to the watermarked view. In a variant, the step of transforming the view into a spatial-frequency representation of the view comprises the one dimensional wavelet transform along columns of each column of the view, into the wavelet domain. In other words, the spatial representation of view is transformed into a spatial-frequency representation. Therefore, according to the chosen embodiments, watermarking is computed either in wavelet domain or in the spatial domain, thus beneficing from the advantages of each techniques.

In a fourth preferred embodiment, the step of projecting the view further comprises a last step of transforming the invariant vector into a spatial-frequency representation of the invariant vector and in that the step of applying a watermarking algorithm comprises applying the watermarking algorithm to the spatial-frequency representation of the invariant vector resulting into a watermarked invariant vector. Accordingly, the step of modifying the view into the watermarked view further comprises the steps of subtracting the spatial-frequency representation of the invariant vector from the watermarked spatial-frequency representation of the invariant vector obtaining a spatial-frequency representation of the invariant watermark vector; a step of transforming back the spatial-frequency representation of the invariant watermark vector into an invariant watermark vector; a step of distributing the invariant watermark vector along the view invariant dimension resulting into a watermark signal; a step of merging the watermark signal with the view resulting into a watermarked view. This embodiment advantageously reduces the computation time and power for a spatial-frequency transform since the transform is processed on the 1D invariant vector rather than on the 2D view.

In another preferred embodiment, the step of distributing the invariant watermark vector comprises the duplication of the invariant watermark vector along the view invariant dimension. This embodiment is well adapted when the projection function is the sum of the samples values along parallel lines.

In another preferred embodiment, the step of merging the watermark signal comprises a step of adding the watermark signal to the view. According to a variant embodiment, before the step of adding watermark signal, the method further comprises a step of the masking of the watermark signal with a perceptual mask derived from the view. This embodiment is well adapted to views where perceptual constraints, such as luminance and/or frequency masking, challenge the invisibility of the watermark. Besides, this embodiment also copes with occlusion issues induced by the different positions of the cameras.

According to another aspect, the invention also relates to a method for watermark detection in multi views video comprising a rendered view selected among or synthesized from a plurality of views captured with a plurality of cameras. The detection method is remarkable in that it comprises, for the rendered view; a step of projecting the rendered view onto a domain invariant to the plurality of views and to intermediate synthesized views, which depends of the locations, orientations and intrinsic parameters of the cameras, resulting into an invariant rendered vector; a step of applying a watermark detection algorithm to the invariant rendered vector in order to assess the presence of a watermark. It is worth noting that the invariant domain applies as well to the real views or to a virtual view granted that the real and virtual cameras share position and orientation constraints. In other words, any synthetic view generated from the set of real view should project to the same invariant vector using this function. Therefore, as for embedding, the multi view issue or synthetic view issue for the watermark detection is reduced to classic watermark detection in the invariant domain. Thus, known watermark detection algorithm advantageously applies to the rendered view invariant vector. Moreover, the detection method advantageously allows blind detection in arbitrary rendered view since it does not require any real view. Besides, processing means are advantageously reduced in term of power and time. Watermarking can hence also be used for applications other than copyright protection, when the original content is no longer available such as broadcast monitoring, audience metering.

As for the embedding method, in a preferred embodiment, the invariant domain comprises the plurality of samples values along any line parallel to the line passing through the optical centers of the cameras, provided that (i) the optical axis of the cameras are parallel, (ii) the optical axis are orthogonal to the line passing through the optical centers of all cameras, (iii) all cameras share the same focal distance, and (iv) there is no rotation between the cameras. In another preferred embodiment, the step of projecting further comprises summing samples values along parallel lines of the view. In another preferred embodiment, the method comprises a first step of transforming the rendered view into a spatial-frequency representation of the view or a step of transforming the invariant vector into a spatial-frequency representation of the vector. Then the watermark detection algorithm is applied to the spatial-frequency representation of the invariant rendered vector in order to assess the presence of a watermark.

BRIEF DESCRIPTION OF THE DRAWINGS

Other characteristics and advantages of the invention will appear through the description of a non-limiting embodiment of the invention, which will be illustrated, with the help of the enclosed drawings.

DETAILED DESCRIPTION OF PREFERRED EMBODIMENTS

Figure 1:
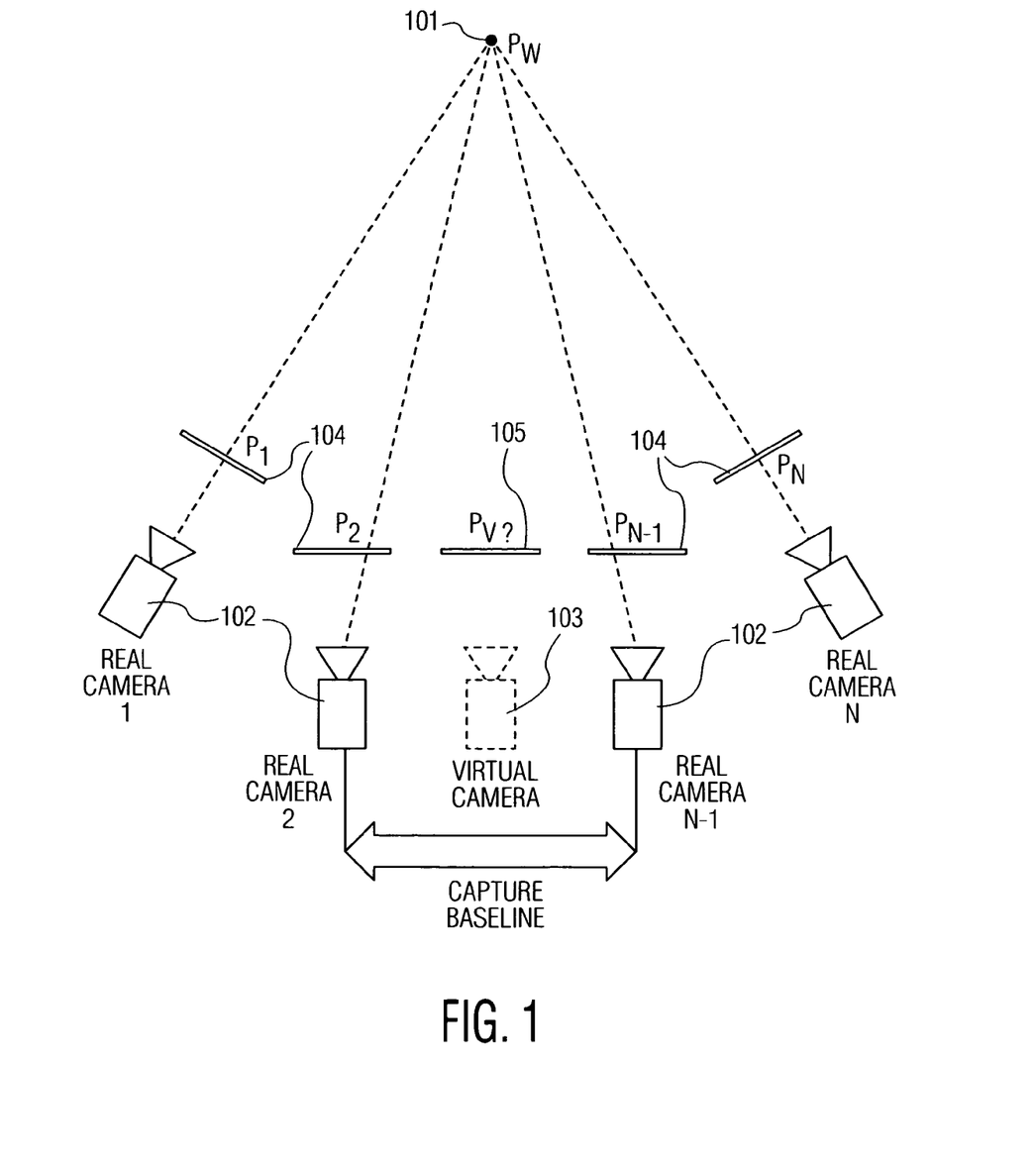
FIG. 1 represents multi views capture for free view video.

FIG. 1 represents multi views capture for free view video. A scene 101 is captured by N cameras 102, called real cameras. The positions, orientations, and intrinsic parameters of the cameras may be different, hence resulting in N different views 104 of the same scene 101. By convention naming in the present document, a single view video content comprises images while a multi view video comprises views. Indeed, views refer to an image of a video content representing the same scene capture from different locations. A point of the scene in the 3D space $P_w$ is respectively represented in the 1 to N real camera views by the pixels $P_1$ to $P_N$.

In free view video, those views are transmitted to a TV set along with N depth-maps describing the depth of the object in the video. The TV set displays any of the real view or an intermediate view, called virtual view or synthesized view. The view displayed by the TV set is called rendered view. The virtual view 105 is synthesized from the real views 104 and corresponds to a virtual camera 103 set in between the real cameras 102. The point $P_w$ is represented in the virtual camera view 105 by the pixel $P_v$.

Figure 2:
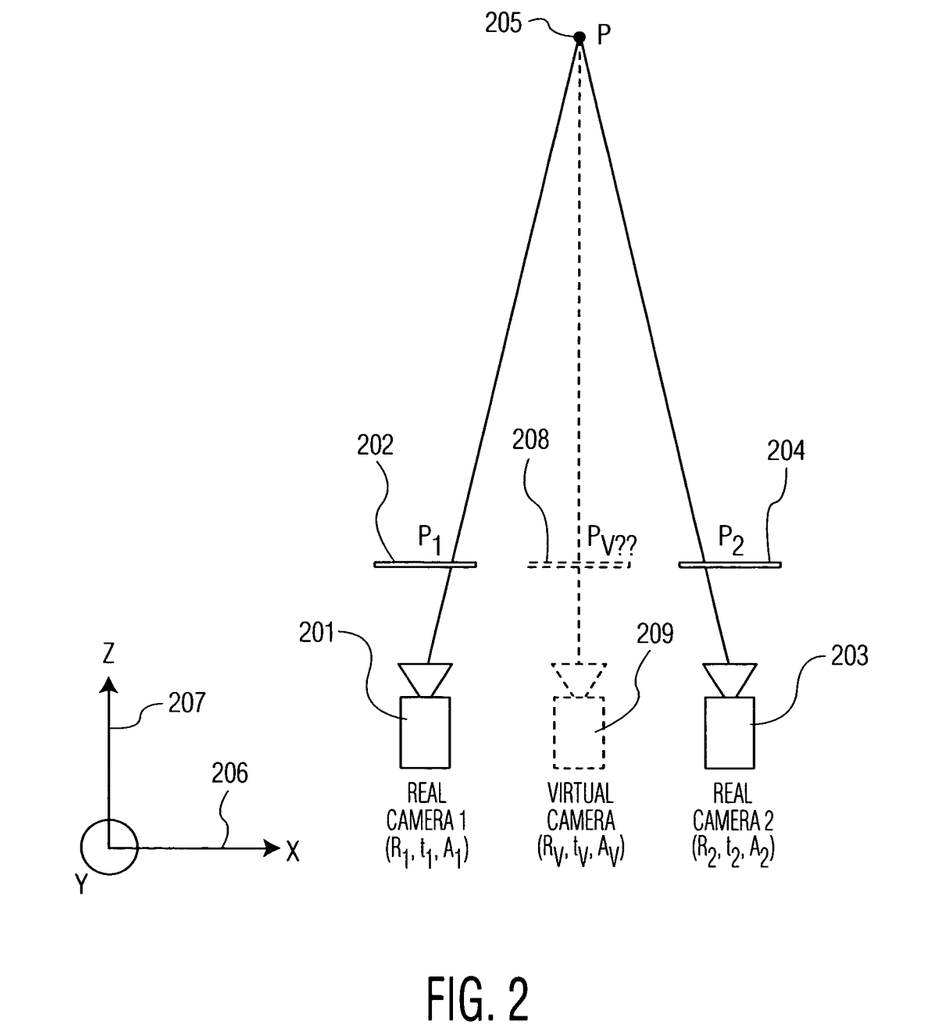
FIG. 2 represents left and right views capture for stereo 3D.

FIG. 2 represents left and right views capture for stereo 3D. In stereo 3D, the TV set successively displays 2 views corresponding to the left view and the right view, the human visual system reconstructing the space vision of the scene. The TV set is also able to synthesize a virtual view adapted to the user environment such as the position of the viewer in the room and/or the display size. Thus, in a typical case, the stereo 3D comprises a real camera 201 capturing the left view 202 and a real camera 203 capturing the right view 204 of a scene 205. The point P in the 3D space is represented by the pixel $P_1$ in the left view and pixel $P_2$ in the right view. In typical stereo 3D capture, cameras 201 and 203 are aligned on a horizontal axis 206 and directed along a perpendicular axis 207. According to a variant, an intermediate view 208, corresponding to a view captured by a virtual camera 209 is synthesized by the TV set using either the left view 202, or the right view 204, or both. Then the intermediate view 208 is rendered to the user as a left or right view. This intermediate view enhances the user visual comfort. This process is called baseline correction.

The synthesis of a virtual view is obtained by shifting each pixel $P_1$ of the left view by a horizontal displacement $d_1$, this displacement depending on the depth of the point P in the view and the intrinsic parameters of the real cameras. This principle also applies to the displacement of the pixel $P_2$ in the right view, since the pixel corresponds to the same point P in the scene.

Figure 3:
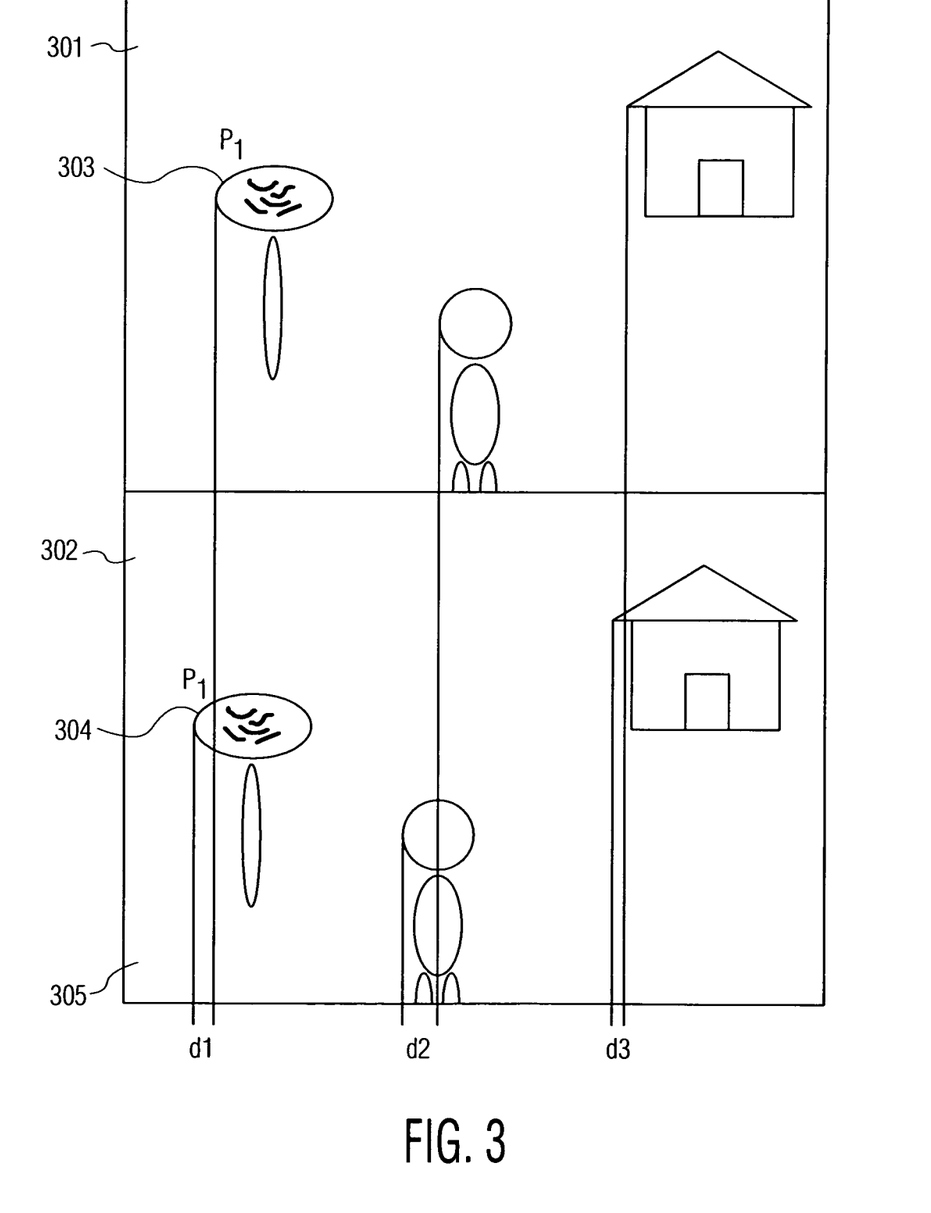
FIG. 3 illustrates the displacement of pixels in two different views of the same scene.

FIG. 3 represents the displacements of several pixels in two different views of the same scene. A left view 301 and a right view 302 give 2 representations of the same scene composed of 3 objects, namely a character in the foreground, a house in the background and a tree in-between. A point of the tree is represented by the pixel $P_1$. The coordinates 303 of the pixel $P_1$ in the left view 302 and the coordinates 304 of the same pixel $P_1$ in the right view 302 differ. This variation raises the issue of watermarking different views in a coherent way, since the coordinates of a pixel carrying a watermark sample varies from one view to another. When real and virtual cameras are aligned, which is the case in most applications such as baseline correction in stereo 3D, the displacement $d_1$ is along the horizontal axis only 305. More generally, if (i) the optical axis of the cameras are parallel, (ii) the optical axis are orthogonal to the line passing through the optical centers of all cameras, (iii) all cameras share the same focal distance, and (iv) there is no rotation between the cameras, the displacement of a point occurs along an axis parallel to the axis passing through the optic center of the cameras. Thus, if the watermark signal is invariant along this axis, it will be the same on any real view or any synthesized intermediate view. This axis defines the invariant domain of the present invention.

In practice, the problem is slightly more complicated because of occlusions: some objects parts appear only on some views, and not on others. However, occlusions cover only a very small area of the views and can be neglected for our purpose.

Figure 4:
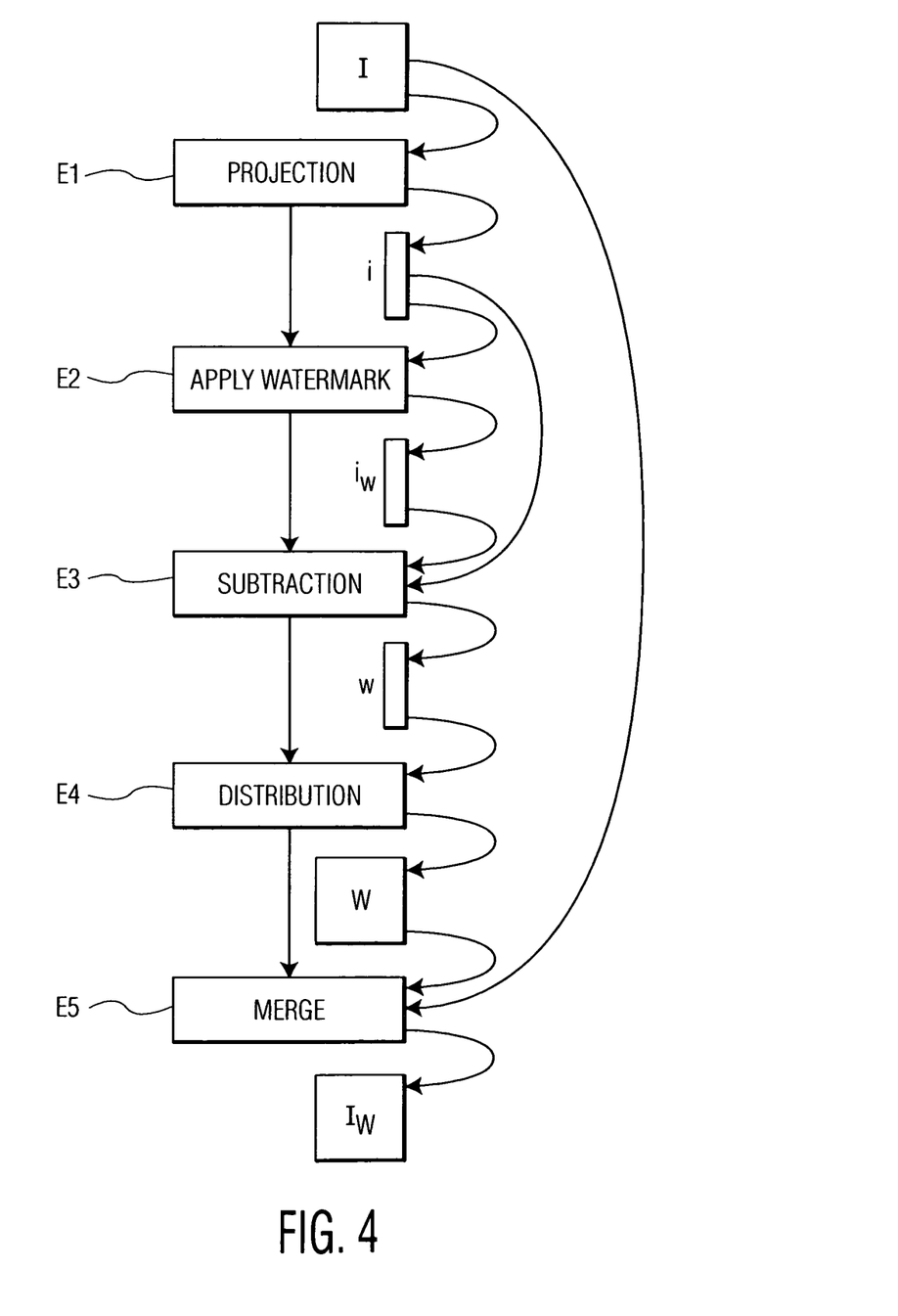
FIG. 4 represents the method of watermark embedding according to a particular embodiment.

FIG. 4 diagrammatically represents the method of watermark embedding according to a particular embodiment where the watermark is embedded in the spatial domain. The multi view video comprises N views, and the following steps are repeated in parallel or sequentially for each one of the N views.

The real view I is represented in the spatial domain by pixel values using RGB or YCrCb convention. In a preferred embodiment, the luminance value is used as the pixel value of a view I in the spatial domain.

In a first step E1, the spatial representation of the view I is projected onto an invariant space using a projection function to produce an invariant vector i. In other words, any synthetic view generated from the set of real views or any real view should project to the same invariant vector using this projection function. In this embodiment, the projection function is for instance, the sum of the samples values along the lines of a view constituting the invariant domain. In a refinement where the cameras are aligned on the horizontal axis, the projection function is the sum of the luminance values along horizontal lines.

In a next step E2, the invariant vector i is then watermarked using any state of the art watermarking embedding algorithm such as spread-spectrum watermarking or quantization-based watermarking, to produce an invariant watermarked vector $i_w$.

Subsequently, in a step E3, the invariant watermark vector $w = i_w - i$ is computed.

In a step E4, the invariant 1D watermark vector w is then mapped back to the spatial representation domain using a distribution function to obtain a 2D watermark signal W. Hence the watermark signal W has the same dimensions than the view I. In an embodiment, the distribution function consists in duplicating the vector w several times along the invariant axis of the projection with a normalization factor. To enable blind detection, the watermark signal should have a non null DC component along the horizontal axis. In the spatial domain, a pseudo-random vector v of dimension h (view height) is generated, for instance following a Gaussian law. A band-pass filter f is applied to the vector v to obtain a band-pass pseudo-random watermark vector $v^H$. Then, the watermark vector is duplicated I (view width) times to get a h×I 2D watermark signal, W.

Then, in a step E5 the view I and the watermark signal W are merged together using some fusion algorithm to generate the output watermarked view $I_w$. In a preferred embodiment, the fusion function only comprises a simple addition:

$$I_W = I + bW$$

where $b \in \{-1, 1\}$ is the watermark bit to insert. In the most general cases, the watermark signal W may also depend on the real view I. Thus, in a variant, the fusion function further comprises a masking function to cope with some perceptual constraints. To do so, the watermark signal W may be modulated by a visibility mask M(I) prior to addition:

$$I_w = I + bW \cdot M(I)$$

where the operator · denotes the term by term multiplication of two matrices. This visibility mask may depend on the local frequency features of the image (frequency masking) and/or the local pixel intensity of the image (luminance masking). Variant embodiments for the masking function M are therefore M(I)=1 corresponding to no perceptual shaping; M(I)=I corresponding to luminance masking resulting in multiplicative embedding; and M(I)=Σ(I), where Σ(I) is a matrix containing the local variance around each pixel position, corresponding to frequency masking. Finally, the fusion function may be tailored so as to minimize the watermark energy loss due to unavoidable rounding and clipping operations.

The steps E3 to E5 therefore propose a method to recover a watermarked view $I_w$ that projects into $i_w$.

Figure 5:
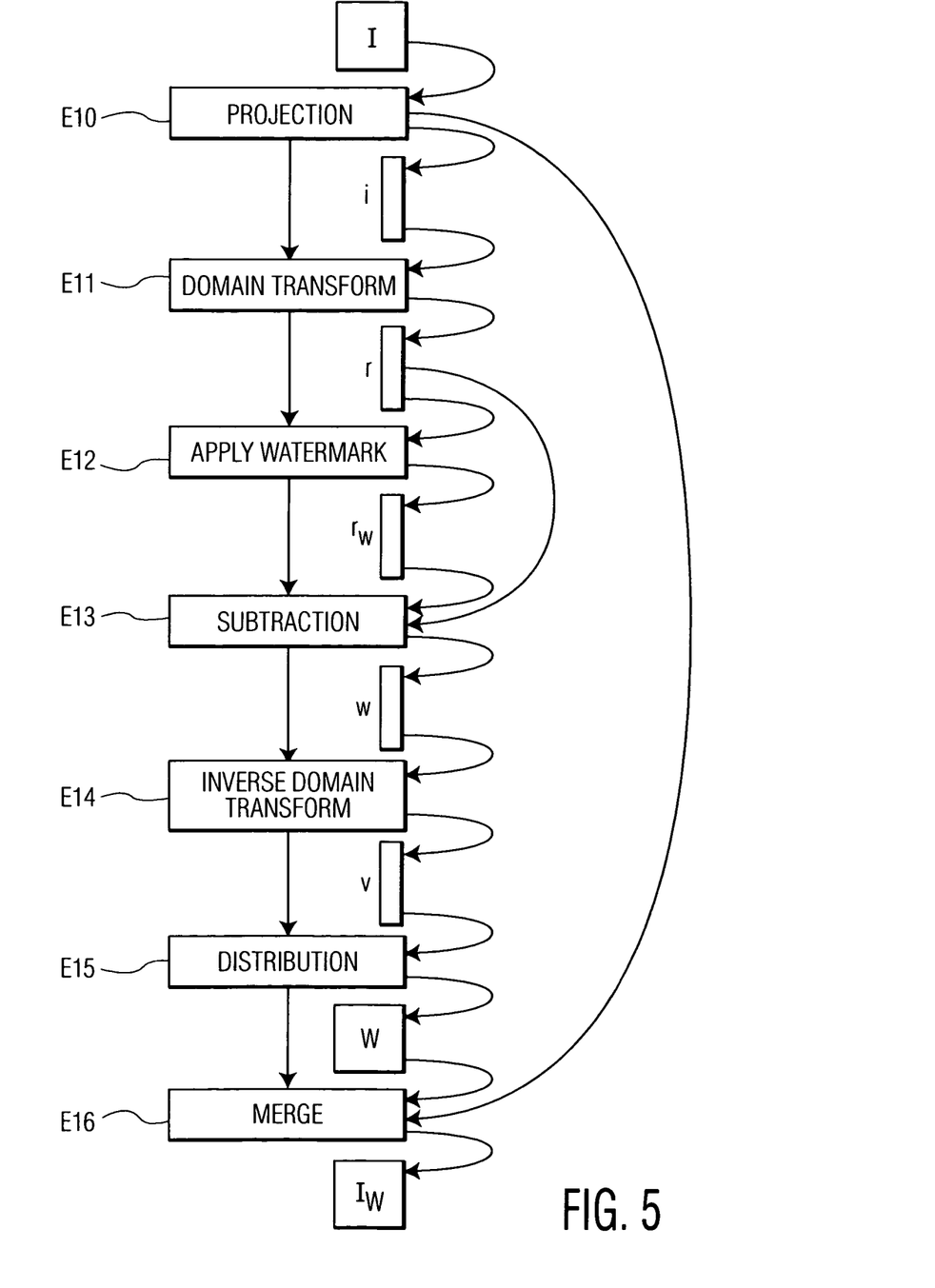
FIG. 5 represents the method of watermark embedding according to another particular embodiment.

FIG. 5 diagrammatically represents the method of watermark embedding according to another particular embodiment, where the watermark is embedded in a spatial-frequency domain. The skilled in art of watermarking will appreciate that the watermark is embedded in different representation domains such as the spatial domain or the wavelet domain. Thus, if the real view I is represented in the spatial domain by pixels, the real view I is also represented in the frequency domain by a wavelet transform of the view.

In a first step E10, the view I is projected onto an invariant space using a projection function to produce an invariant vector i. In other words, any synthetic view generated from the set of real view or any real view should project to the same invariant vector using this projection function.

Then, in a next step E11, a domain transform is applied to the 1D invariant vector i to obtain an appropriate spatial-frequency representation of the invariant vector r. According to this embodiment, a wavelet transform is for instance applied on the vector. In a variant embodiment, the domain transform is directly applied to the real view I to obtain an appropriate spatial-frequency representation of the view. In this latest variant, the domain transform is the 1D column wavelet transform applied to each column of the view, and the projection function is for instance the sum along the lines of the transformed view. However, applying the domain transform on the 1D projected view rather than on the 2D real view advantageously reduces computational time and power.

In a next step E12, the invariant vector r is then watermarked using any state of the art watermarking embedding algorithm such as spread-spectrum watermarking or quantization-based watermarking, to produce an invariant watermarked vector $r_w$. In the wavelet domain, a 1D pseudo-random vector v of length h (image height) is generated. For invisibility and robustness purposes, the strength of each sample of v may be tuned depending on the sub-band it belongs to. For instance, the strength of the low-frequency components may be low (or even null) to prevent visibility of the watermark. On the contrary, the strength of the band-pass components may be higher, since they offer a good visibility-robustness trade-off.

Subsequently, in a step E13, the invariant watermark vector $w = r_w - r$ is computed.

Then, in step E14, the inverse domain transform is applied to obtain the invariant watermark vector v in the spatial domain. According to this embodiment, an inverse wavelet transform is for instance applied on the vector. In the embodiment where the domain transform is applied on the view, not the projected view, the step of inverse transforming is applied after the step of distributing. Thus, a spatial-frequency representation of the watermark is transformed to obtain the watermark W in the spatial domain. In this latest variant, the inverse transform is for instance the 1D column inverse wavelet transform applied to each column of the spatial-frequency representation of the watermark.

In a step E15, the one-dimensional watermark vector w is then mapped back to the spatial representation domain using a distribution function to obtain a two-dimensional watermark signal W. Hence the watermark signal W has the same dimensions than the spatial representation of the view I. In an embodiment, the distribution function consists in duplicating the vector w several times along the invariant axis of the projection with a normalization factor.

Then, in a step E16, the view I and the watermark signal W are then merged together using some fusion algorithm to generate the output watermarked view $I_w$. In a preferred embodiment, the fusion function only comprises a simple addition:

$$I_w = I + bW$$

where $b \in \{-1, 1\}$ is the watermark bit to insert. As for the embodiment relative to spatial domain, a visibility mask M(I) is applied prior to addition enhancing the invisibility of the watermark.

$$I_w = I + bW \cdot M(I).$$

The steps E13 to E16 therefore propose a method to recover a watermarked view $I_w$ that projects into $i_w$.

Figure 6:
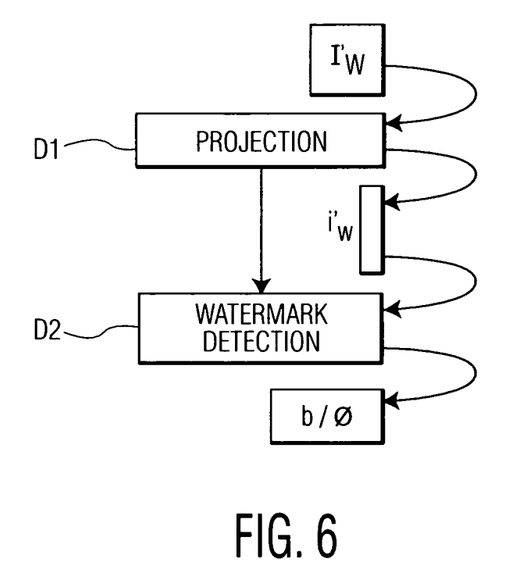
FIG. 6 represents the method of watermark detection according to a particular embodiment.

FIG. 6 diagrammatically represents the method of watermark detection according to a particular embodiment.

The rendered view $I'_w$ is represented in the spatial domain by pixels values. In a first step D1, the view $I'_w$ is projected onto the invariant space using a projection function to produce an invariant vector $i'_w$. In a variant, the method further comprises a domain transform. The transform function and projection function are necessarily identical in the embedding method and the detection method. Therefore, in a variant, prior to step D1, a domain transform is applied to the rendered view $I'_w$ to obtain an appropriate spatial-frequency representation of the view, then projected. Respectively in another variant, following the step D1, a domain transform is applied to the projected view to obtain an appropriate spatial-frequency representation of the invariant vector $i'_w$.

In a second step D2, known watermark detection methods are applied to the one-dimensional vector $i'_w$. According to the spatial representation embodiment, the luminance value of each line of the rendered view $I'_w$ is averaged to obtain an average vector $i'_w$ of dimension h (view height); the band-pass filter f is applied to the average vector $i'_w$; a correlation score is computed for the watermarked band-pass vector $f(i'_w)$ to assess the presence of a watermark; the decoded watermark bit b depends on the correlation sign.

Naturally, the invention is not limited to the embodiments previously described.

In particular, the invention is compatible with any invariant domain (horizontal lines, parallel lines, or more complex projection) depending on the cameras positions and orientations. Moreover, according to a particular characteristic, the watermark embedding is processed in any representation of a view either in spatial domain or in frequency domain. Finally, according to a particular characteristic, the pixels constituting a view in spatial domain are represented by their luminance value, but also chrominance value or any of RGB value.

What is claimed is:

1. A method for watermark embedding in multi views video comprising a plurality of views captured with a plurality of cameras wherein it comprises for each view the steps of:
   projecting the view onto a domain invariant to the plurality of views and to intermediate synthesized view, resulting into an invariant vector, wherein said invariant domain comprises a plurality of the samples values along any line parallel to a line passing through optical centers of the cameras, said parallel lines called view invariant dimension, provided that:
   i) optical axis of the cameras are parallel,
   ii) optical axis are orthogonal to the line passing through optical centers of all cameras,
   iii) all cameras share a same focal distance, and
   iv) there is no rotation between the cameras;
   applying a watermarking algorithm to the invariant vector resulting into a watermarked invariant vector;
   subtracting the invariant vector from the watermarked invariant vector obtaining the invariant watermark vector;
   distributing the invariant watermark vector over the view invariant dimension resulting into a watermark signal;
   merging the watermark signal with the view resulting into a watermarked view.

2. The method according to claim 1 wherein the step of projecting further comprises summing samples values along said invariant dimension of the view.

3. The method according to claim 1 wherein the step of projecting the view further comprises a last step of transforming the invariant vector into a spatial-frequency representation of the invariant vector to which the watermark algorithm is applied.

4. The method according to claim 3 wherein the step of distributing the invariant vector watermark further comprises:
   a first step of transforming back the spatial-frequency representation of the invariant watermark vector into an invariant watermark vector.

5. The method according to claim 1 wherein the step of projecting the view further comprises a first step of transforming the view into a spatial-frequency representation of the view.

6. The method according to claim 5 wherein the step of distributing the invariant watermark vector further comprises:
   a last step of transforming back the spatial-frequency representation of the watermark to the spatial representation of the watermark.

7. The method according to claim 5 wherein the step of transforming the view into a spatial-frequency representation of the view comprises applying the 1D wavelet transform applied to each column of the view.

8. The method according to claim 1 wherein the step of distributing the invariant watermark vector comprises the duplication of the invariant watermark vector in the invariant dimension of view.

9. The method according to claim 1 wherein the step of merging (E5, E16) the watermark signal comprises a step of adding the watermark signal (W) to the view (I).

10. The method according to claim 1 wherein the step of merging the watermark signal further comprises a step of the masking of the watermark signal with a perceptual mask derived from the view.

11. A method for watermark embedding in multi views video comprising a plurality of views captured with a plurality of cameras wherein it comprises for each view the steps of:
    generating an invariant watermark vector in a domain invariant to the plurality of views and to intermediate synthesized view, wherein said invariant domain comprises a plurality of the samples values along any line parallel to a line passing through optical centers of the cameras, said parallel lines called view invariant dimension, provided that:
    i) optical axis of the cameras are parallel,
    ii) optical axis are orthogonal to the line passing through optical centers of all cameras,
    iii) all cameras share a same focal distance, and
    iv) there is no rotation between the cameras;
    distributing the invariant watermark vector over the view invariant dimension resulting into a watermark signal;
    merging the watermark signal with the view resulting into a watermarked view.

12. A method for watermark detection in multi views video comprising a rendered view selected among or synthesized from a plurality of views captured with a plurality of cameras wherein it comprises for the rendered view the steps of:
    projecting the rendered view onto a domain invariant to the plurality of views and to intermediate synthesized view resulting into an invariant rendered vector, wherein said invariant domain comprises a plurality of the samples values along any line parallel to the line passing through the optical centers of the cameras, said parallel lines called view invariant dimension, provided that:
    i) optical axis of the cameras are parallel,
    ii) optical axis are orthogonal to the line passing through the optical centers of all cameras,
    iii) all cameras share a same focal distance, and
    iv) there is no rotation between the cameras;
    applying a watermark detection algorithm to the invariant rendered vector in order to assess the presence of a watermark.

13. The method according to claim 12 wherein the step of projecting the rendered view ($I'_w$) further comprises a last step of transforming the invariant rendered vector ($i'_w$) into a spatial-frequency representation of the invariant rendered vector.

* * * * *